United States Patent Office 3,726,653
Patented Apr. 10, 1973

3,726,653
POLYMERIC POUR POINT DEPRESSANT FOR RESIDUAL FUELS
Pieter H. van der Meij and Rudolf H. Bloembergen, Amsterdam, Netherlands, assignors to Shell Oil Company, New York, N.Y.
No Drawing. Filed Dec. 14, 1970, Ser. No. 98,042
Claims priority, application Great Britain, Dec. 18, 1969, 61,724/69
Int. Cl. C10l 1/18
U.S. Cl. 44—62
3 Claims

ABSTRACT OF THE DISCLOSURE

Wax-containing crude oils and residual fuels containing, as a pour point depressant, a mixture of oil soluble polymers of olefinically unsaturated monomers having aliphatic hydrocarbon side chains with at least 14 carbon atoms and oil soluble copolymers of ethylene and an olefinically unsaturated aliphatic monomer having from 3 to 5 carbon atoms per molecule have improved pour point characteristics.

BACKGROUND

Crude mineral oils (hereinafter called crude oils) frequently contain large amounts of paraffin wax having a melting point above about 35° C. and a boiling point above about 350° C. (hereinafter called higher paraffin wax), and dependent on the mode of their preparation products prepared from such a crude oil, in particular fuels such as residual fuels and flashed distillates, may also contain higher paraffin wax in appreciable amounts.

The term "crude oil" whenever used in this specification and claims denotes all types of mineral oils found in nature, and, besides oils obtained from wells, includes e.g. shale oil and rock oil.

The term "residual fuel" denotes all fuels which are at least partly composed of residual components. The residual components are residues of distillation processes and may have been obtained as residues in the distillation of crude mineral oil under atmospheric pressure (long residue) or under subatmospheric pressure (short residue). They may also consist of distillation residues obtained in thermal or catalytic cracking processes. When the residual components have a viscosity which is too high, they may be blended with components obtained by the distillation of oils, such as gas oils, in order to obtain better flowing residual fuels. The amount of residual components in a residual fuel may vary between wide limits, and in general comprises 20 to 80% wt. of the total fuel.

Flashed distillates are prepared from the so-called atmospheric residue which is obtained in the distillation at atmospheric pressure of a crude oil, or of the products originating from cracking of a petroleum distillation residue. During the flash distillation the atmospheric residue is preheated and passed continuously into a flash chamber, where evaporation takes place under constant equilibrium conditions. Gaseous and liquid products are continuously discharged. The temperature at which flashing is carried out is limited by possible cracking and coke formation. These side reactions will occur if the temperature rises much above 400° C. In flashing a considerably reduced pressure is applied in order to obtain from a given atmospheric residue a higher yield of flashed distillate. As a result of the distillation technique employed the flashed distillates contain higher paraffin wax content than the atmospheric distillates.

In order to reduce the viscosity of flashed distillates to be used as fuels they are blended with components obtained by the non-flashed distillation of oils, e.g. gas oils, in general in amounts from 20–80% wt. of the total fuel.

Fuels containing paraffin wax with a melting point above 35° C. and a boiling point above 350° C. will hereinafter be called heavy fuels. This type of fuel is used for many purposes, such as heating and for running diesel engines at low speeds.

The paraffin wax will separate out if the temperature of the crude oil or the heavy fuel containing higher paraffin wax drops below a certain temperature. Upon further cooling the paraffin wax continues to separate out until eventually the paraffin wax/oil mixture no longer flows. The lowest temperature, observed during a standard laboratory test, at which the waxy mixture still flows, is called the pour point.

The pour point of a crude oil or a heavy fuel is of great practical importance. In order to avoid difficulties, such as blocking of transport lines and clogging of filters, when these products are used, their pour point should lie below the minimum temperature at which the crude oil or the heavy fuel will be stored, transported and used.

It is known that special types of polymers, in particular polymers obtained by polymerization of compounds containing aliphatic hydrocarbon side chains with at least 14 carbon atoms and containing an olefinically unsaturated bond, lower the pour point of paraffin-wax-containing oils if dissolved therein in small amounts. The pour-point-depressing activity of these types of polymers is permanent. This means that the pour point determined a short time after incorporation of the polymer into the crude oil or the heavy fuel and the pour point determined after a considerable storage period do not differ significantly.

However, the lowest pour point which can be attained for compositions obtained by addition of the said types of polymers to crude oils or heavy fuels which contain higher paraffin wax is not always satisfactory, for example where the ambient temperature of the sites where the crude oils or heavy fuels are to be stored or transported is too low. This is particularly the case if the crude oil or heavy fuel contains comparatively large amounts of higher paraffin wax.

It is also known that there is a type of copolymer obtained by copolymerization of ethylene and an olefinically unsaturated aliphatic monomer having 3 to 5 carbon atoms per molecule and containing 1 to 40% by weight of units which originate from the olefinically unsaturated aliphatic monomer, which, when incorporated as the only polymer into a crude oil or a heavy fuel containing higher paraffin wax decreases the pour point of the oil compositions. This pour point depression is not permanent, however, and moreover the lowest pour point which can be attained also does not always meet the requirements of external circumstances, as for instance ambient temperature as discussed above.

THE INVENTION

It has now been found that incorporation of both types of polymers discussed above into a crude oil or a heavy fuel gives oil compositions with a very low and a permanent pour point.

Accordingly the invention is a crude mineral oil composition or a fuel composition with depressed pour point, comprising a major proportion of wax-containing crude mineral oil or a wax-containing fuel of which 5% to 20% of the waxes consist of waxes with a melting point above 35° C. and a boiling point above 350° C. and minor proportions, 0.001% to 2.0%, of:

(a) an oil-soluble polymer (polymer I) of an olefinically unsaturated monomer containing aliphatic hydrocarbon side chains with at least 14 carbon atoms, and (b) a copolymer (polymer II) of ethylene and an olefinically unsaturated aliphatic monomer with from 3 to 5 carbon atoms per molecule, said copolymer containing from 1 to 40% by weight of units originating from the olefinically unsaturated aliphatic monomer.

In order to be suitable for application according to the invention, polymer I should contain hydrocarbon side chains with 14 to 30 carbon atoms hereinafter to be called long hydrocarbon side chains. Preferred are polymers wherein the long hydrocarbon side chains are unbranched and saturated, that is, polymers in which the long hydrocarbon side chains can be represented by the formula $CH_3-(CH_2)_n-CH_2-$, in which $n \geq 12$. Preferably polymers are chosen with long hydrocarbon side chains wherein the number of carbon atoms is at least 16 and at most 30, particularly at least 18 and at most 26.

Although polymer I may contain one or more aromatic rings (e.g., alkyl- or acylstyrenes), aliphatic compounds containing an olefinically unsaturated bond are preferred.

Polymer I consists of a main chain (alkyl, aryl or alkaryl) built up of carbon atoms, which has long hydrocarbon side chains. These long hydrocarbon side chains may be attached either directly or indirectly to the main chain. In the former case there are no further atoms between the first carbon atom of the long hydrocarbon side chain and the carbon atom of the main chain to which the side chain is attached. If the long hydrocarbon side chain is attached indirectly to the main chain, one or more other atoms such as carbon, oxygen, sulphur, nitrogen or phosphorus atoms are present between the first carbon atom of the long hydrocarbon side chain and the carbon atom of the main chain to which the side chain is attached. Preference is given to polymers wherein the long hydrocarbon side chains are attached indirectly to the main chain, via one or more oxygen atoms; other groups or atoms may be present between the said oxygen atom(s) and the main chain. Some examples of polymers wherein the long hydrocarbon side chains are attached indirectly to the main chain via one or more oxygen atoms are polymers wherein the long hydrocarbon side chains are attached to the main chain via a carboxyl group or via an oxygen atom.

The preparation of such polymers (polymer I) may basically be carried out in two manners. First, they may be prepared by polymerization of olefinically unsaturated compounds, of which at least a portion consists of olefinically unsaturated compounds containing, in addition to a polymerizable $-C=C-$ group, a long hydrocarbon chain. Olefinically unsaturated compounds of this type will hereinafter be termed olefinically unsaturated compounds containing a long hydrocarbon chain. Second, they may be prepared by polymerization of olefinically unsaturated compounds containing no long hydrocarbon chain and after-treatment of the polymer whereby long hydrocarbon chains are introduced into it as side chains.

The polymers (polymer I) according to the invention may be either homopolymers or copolymers.

If the preparation of polymer I is carried out by direct polymerization, that is, without an after-treatment, the material to be polymerized should invariably contain olefinically unsaturated compounds with long hydrocarbon chains. When homopolymers are prepared in this manner, the starting material is one specific olefinically unsaturated monomer with a long hydrocarbon chain. When copolymers are prepared in this manner, the starting material is a monomer mixture which, in addition to a specific olefinically unsaturated monomer with a long hydrocarbon chain, contains one or more other monomers which may or may not contain a long hydrocarbon chain.

If the preparation of polymer I is carried out by indirect polymerization, i.e. including an after-treatment, the material to be polymerized need not contain any olefinically unsaturated compounds with long hydrocarbon chains. When homopolymers are prepared in this manner, the starting material is one specific olefinically unsaturated monomer from which a polymer can be prepared that is suitable for the desired after-treatment. When copolymers are thus prepared, the starting material is, for example, a mixture of monomers, which, in addition to one specific monomer from which a polymer may be prepared that is suitable for the desired after-treatment, contains one or more other monomers which may or may not contain a long hydrocarbon chain.

The molecular weight of polymer I applicable in the compositions of the invention may vary between wide limits. Preferably the average molecular weight (number average) ranges between 1,000 and 1,000,000, particularly between 4,000 and 100,000.

Depending upon the nature of the paraffin waxes present in the crude oil or the residual fuel, it may be preferable to incorporate a polymer wherein the long hydrocarbon side chains differ in chain length by a number of carbon atoms.

Some examples of olefinically unsaturated compounds containing long hydrocarbon chains, suitable for the preparation of polymer I according to the invention, are vinyl esters and allyl esters of saturated monocarboxylic acids, such as vinyl esters and allyl esters of arachidic acid and behenic acid; alkyl esters of unsaturated monocarboxylic acids, such as n-octadecyl acrylate, and n-eicosyl methacrylate, alkyl amides of unsaturated monocarboxylic acids such as n-eicosyl acrylamide and n-docosyl methacrylamide; dialkyl esters of unsaturated dicarboxylic acids, such as di-n-octadecyl maleate and di-n-tetracosyl fumarate; dialkylamides of unsaturated dicarboxylic acids, such as di-n-eicosylmaleic diamide and di-n-docosylfumaric diamide; imides of unsaturated dicarboxylic acids, such as n-octadecylmaleic acid imide and n-eicosylmaleic acid imide; alkyl vinyl ethers, such as n-docosyl vinyl ether and n-titracosyl vinyl ether and mono-olefins such as 1-octacosene and 1-docosene.

Some examples of olefinically unsaturated compounds which have no long hydrocarbon chains, but which can be copolymerized with compounds which do possess such long hydrocarbon chains are, for instance, vinyl esters of unsaturated monocarboxylic acids, such as vinyl acetate; alkyl esters of unsaturated mono- and dicarboxylic acids, such as methyl methacrylate and diethyl maleate, alkyl vinyl ethers, such as octyl vinyl ether and mono-olefins, such as ethene and isobutene.

Some examples of polymers obtained by direct polymerization of olefinically unsaturated compounds of which at least a proportion consists of olefinically unsaturated compounds with long hydrocarbon chains, are copolymers of vinyl esters of saturated monocarboxylic acids with one another, copolymers of allyl esters of saturated monocarboxylic acids with one another, homopolymers of alkyl esters of unsaturated monocarboxylic acids, copolymers of alkyl esters of unsaturated monocarboxylic acids with one another, copolymers of alkyl esters of unsaturated monocarboxylic acids with dialkyl esters of unsaturated dicarboxylic acids or with mono-olefins, homopolymers of dialkyl esters of unsaturated dicarboxylic acids, copolymers of dialkyl esters of unsaturated dicarboxylic acids with mono-olefins, homopolymers of alkyl vinyl ethers, and copolymers of alkyl vinyl ethers with one another.

If polymer I is a copolymer, it may contain two or more different monomers.

Very favorable results may be obtained by utilizing polymer I as homo- or copolymers of alkyl esters of olefinically unsaturated carboxylic acids, such as alkyl esters of alpha, beta olefinically unsaturated monocarboxylic acids, in particular of alkyl acrylates. Examples of very suitable homopolymers of alkyl acrylates are homopolymers of n-tetradecyl acrylate, homopolymers of n-hexadecyl acrylate, homopolymers of n-octadecyl acrylate and homopolymers of n-eisocyl acrylate.

The olefinically unsaturated aliphatic monomer containing from 3 to 5 carbon atoms in polymer II may consist of an olefin or diolefin such as butene, butadiene and isoprene. Compounds containing other atoms than carbon and hydrogen are preferred, such as nitrogen-containing compounds, e.g. acrylonitrile or vinyl acetonitrile, and in particular oxygen-containing compounds such as vinylethers (e.g. ethyl vinyl ether, divinylether), allyl ethers (e.g. allyl ethyl ether), esters of unsaturated acids (e.g. methyl methacrylate, ethylacrylate). The compounds most preferred for incorporation into polymer II, besides ethylene, are vinyl esters of aliphatic monocarboxylic acids such as vinyl propionate and in particular vinyl acetate, since polymers II containing the latter vinylesters are very suitable constituents of the oil compositions according to the invention.

Copolymers II suitable for use in the oil compositions according to the invention may be prepared by direct copolymerization of ethylene and an olefinically unsaturated aliphatic monomer containing from 3 to 5 carbon atoms per molecule. It is also possible, however, to prepare polymer II by after-reaction of a copolymer which is not a copolymer of ethylene and an olefinically unsaturated aliphatic monomer containing from 3 to 5 carbon atoms per molecule. For example, polymer II may be prepared by hydrogenation of a copolymer obtained by copolymerization of butadiene and an olefinically unsaturated aliphatic monomer containing from 3 to 5 carbon atoms per molecule, wherein at least part of the butadiene units has been taken up in the main chain by 1,4 polymerization.

Polymer II must contain from 1 to 40% wt. of units originating from the olefinically unsaturated aliphatic monomer. It is preferred that not too long unbranched polyalkylene chains are present in the main chain of polymer II since those chains may reduce the solubility of the copolymer in the crude oil or the heavy fuel to an undesirably low level. For that reason polymers II are preferred which contain from 5 to 40% wt. of units which originate from the olefinically unsaturated aliphatic monomer containing from 3 to 5 carbon atoms in the molecule.

The molecular weight of copolymer II to be used in the oil compositions according to the invention may vary between wide limits. Number average molecular weights between 700 and 100,000 in particular between 20,000 and 60,000, are very suitable.

The concentration in which each of the polymers I and the polymers II are to be applied may vary between wide limits, depending upon the nature, the structure and the molecular weight of the polymers, the nature of and the quantity of the paraffin waxes present in the crude oil or the heavy fuel and the desired improvement of the flow properties. In some instances, a quantity of 0.001% wt., calculated on the oil composition, is sufficient for attaining the desired improvement. In most cases, a quantity of 2.0% wt. is more than sufficient. Preferably, from 0.002% wt. to 0.2% wt. of the polymers is incorporated into the crude oil or the heavy fuel.

The weight ratio of polymer I to polymer II may vary within wide limits but preferably it is between 0.1 and 10.

The oil compositions according to the invention can be prepared from crude oils or heavy fuels which contain relatively small amounts of waxes with a melting point above 35° C. and a boiling point above 350° C.; for example, partly dewaxed crude oils or partly dewaxed heavy fuels can be used as the oil component of the oil compositions.

The compositions according to the invention are, of special advantage if crude oils or heavy fuels which contain relatively large amounts of wax with a melting point above 35° C. and a boiling point above 350° C. are used as the oil component, since no dewaxing is necessary in order to obtain compositions with a very low pour point. It is preferred that the crude oil or heavy fuel contain at least 5% wt., in particular between 8 and 20% wt. of waxes with a melting point above 35° C. and a boiling point above 350° C.

The compositions according to the invention may be prepared in any convenient way. Polymer I and polymer II may for example, be added to the oil as such, as a concentrate in oil, or as a concentrate in a volatile solvent, which solvent can be removed from the oil composition, e.g. by distillation. Polymer I and polymer II may be added to the oil separately or mixed together.

Crude oil compositions according to the invention can be stored or transported through pipelines (e.g. by pumping), with tankers or in some other way, at low temperatures without any wax present in the crude oil precipitating. Polymer I together with polymer II are also very suitable for use in oil wells producing waxy crude oil, to prevent the formation of waxy deposits or to dissolve deposits present on the walls of the well.

The use of the heavy fuel compositions according to the invention is of special advantage in order to prevent difficulties which the wax present in the heavy fuel may cause at low temperatures during storage and transport as well as in uses where the fuel often has to pass through filters and narrow openings. The heavy fuel compositions may contain small quantities of compounds which are generally added to fuels of this type, such as antioxidants, anti-corrosion additives, metal deactivators and additives for preventing filter clogging and emulsification and the like.

EXAMPLE

To a residual fuel, with a viscosity of 128 cs. at 50° C., which contained 13.7% wt. of wax with a melting point of 58° C. and a boiling point above 350° C., were added 400 parts per million of a homopolymer of n-eicosyl acrylate with a number average molecular weight of 23,200 (polymer I) and 200 parts per million of a copolymer of ethylene and vinyl acetate of which 28% wt. originated from vinyl acetate and which copolymer had a number average molecular weight of 40,000 (polymer II).

The pour point of the fuel composition obtained was determined according to ASTM method D–97 after one day's storage at 22° C. and after 21 days' storage at 22° C.

The results are given in the table, wherein for comparison the pour point of the same fuel without either polymer I or polymer II, with both and with polymer I or polymer II has been recorded. It can be seen that only the presence of both polymers together gives a composition with a very low pour point, which does not increase during storage.

TABLE

| | Fuel without polymer I or II | Fuel with 400 p.p.m. polymer I | Fuel with 200 p.p.m. polymer II | Fuel with 400 p.p.m. polymer II | Fuel with 400 p.p.m. polymer I and 200 p.p.m. polymer II [1] |
|---|---|---|---|---|---|
| Pour point (° C.) after— | | | | | |
| 1 day storage | 35 | 23 | 32 | 23 | 8 |
| 22 days storage | 35 | 20 | 32 | 32 | 8 |

[1] According to the invention.

We claim as our invention:
1. An oil composition having improved pour point characteristics which comprises wax-containing residual fuel wherein about 5% to 20% by weight of said wax has a boiling point greater than 350° C. and a melting point greater than 35° C. having incorporated therein an effective pour point depressing amount from 0.001% to 2.0% by weight each of a mixture of (1) an oil-soluble homopolymer of an alkyl ester of an olefinically unsaturated lower monocarboxylic acid having aliphatic hydrocarbon side chains with from 14 to 30 carbon atoms and an average molecular weight of 1,000 to 1,000,000 and (2) an oil-soluble copolymer of ethylene and a vinyl ester of an aliphatic saturated monocarboxylic acid having 3 to 5 carbon atoms per ester molecule and containing 1% to 40% by weight of units originating from said vinyl ester, the copolymer having an average molecular weight of 20,000 to 60,000 wherein the weight ratio of the homopolymer of (1) to the copolymer of (2) is 0.1–10:1.

2. The composition of claim 1 in which said oil-soluble homopolymer is a homopolymer of n-eicosyl acrylate.

3. The composition of claim 1 in which said oil-soluble homopolymer is a homopolymer of n-eicosyl acrylate and said oil-soluble copolymer is a copolymer of ethylene and vinyl acetate.

References Cited

UNITED STATES PATENTS 3,567,639  3/1971  Aaron et al. -------- 44—62 X

FOREIGN PATENTS 1,154,966  6/1969  Great Britain --------- 44—62
1,161,188  8/1969  Great Britain --------- 44—62

DANIEL E. WYMAN, Primary Examiner

W. J. SHINE, Assistant Examiner

U.S. Cl. X.R.

44—70